US006254306B1

(12) United States Patent
Williams

(10) Patent No.: US 6,254,306 B1
(45) Date of Patent: Jul. 3, 2001

(54) SKEWABLE CONNECTOR FOR METAL TRUSSES

(76) Inventor: Troy D. Williams, 1720 Split Ridge Trail, Knoxville, TN (US) 37922

( * ) Notice: Subject to any disclaimer, the term of this patent is extended or adjusted under 35 U.S.C. 154(b) by 0 days.

(21) Appl. No.: 09/342,306

(22) Filed: Jun. 29, 1999

(51) Int. Cl.[7] .................................................. F16B 15/00
(52) U.S. Cl. ........................... 403/403; 52/92.2; 52/93.1
(58) Field of Search ................................ 403/403, 13, 14, 403/232.1; 144/353, 354; 411/457, 461, 466, 470, 475, 467, 488; 52/92.1, 92.2, 92.3, 93.1, 93.2, 257, DIG. 6

(56) References Cited

U.S. PATENT DOCUMENTS

| | | |
|---|---|---|
| 1,161,559 | 11/1915 | Weigel . |
| 1,308,265 | 7/1919 | Spear et al. . |
| 2,666,508 | 1/1954 | Nardulli . |
| 2,757,890 | 8/1956 | Sutton et al. . |
| 2,785,035 | 3/1957 | Hammer . |
| 3,854,268 | * 12/1974 | Gutner ................................. 403/403 |
| 4,236,847 | 12/1980 | Yasuda . |
| 4,410,294 | * 10/1983 | Gilb et al. ........................ 403/403 X |
| 4,560,301 | * 12/1985 | Gilb ................................. 403/403 X |
| 4,572,695 | * 2/1986 | Gilb .................................. 403/14 X |
| 4,710,083 | 12/1987 | Wolf . |
| 5,150,982 | * 9/1992 | Gilb ................................. 403/403 X |
| 5,186,571 | * 2/1993 | Hentzeschel ..................... 403/403 X |
| 5,457,927 | 10/1995 | Pellock . |
| 5,457,928 | * 10/1995 | Sahnazarian ..................... 403/403 X |
| 5,603,580 | * 2/1997 | Leek et al. ............................ 52/93.1 |
| 5,632,128 | * 5/1997 | Agar ................................. 411/461 X |
| 5,797,694 | * 8/1998 | Breivik ............................. 403/403 X |

OTHER PUBLICATIONS

Metal Truss Notes—vol. 2, Issue 1—Metal Truss, LLC—Fall 1998.
FA/FAP/HFA/FJA FSA Foundation Anchors—Simpson Strong–Tie Co., Inc.—Catalog C–98, pp. 23, 51.
Sweets catalog–Simpson Strong Tie Connectors, strap tie located at bottom of page.
Sweets catalog–Simpson Strong Tie, p. 57, tie plate item tp located at top of page.

* cited by examiner

Primary Examiner—Lynne H. Browne
Assistant Examiner—David E. Bochna
(74) Attorney, Agent, or Firm—Pitts & Brittian, P.C.

(57) ABSTRACT

A skewable connector having positioning tabs for connecting metal trusses. The skewable connector is formed of a substantially planar piece of rigid material, preferably steel, and in the preferred embodiment defines a quadrilateral. The skewable connector includes a first end and a second end, the junction there between defining a fold line. In order to facilitate skewing of the connector, a plurality of hole members, which are preferably elliptical, are disposed along the fold line. At least two positioning tabs are disposed on said first end proximate the fold line.

7 Claims, 2 Drawing Sheets

SKEWABLE CONNECTOR FOR METAL TRUSSES

CROSS-REFERENCE TO RELATED APPLICATIONS

This application in part discloses and claims subject matter disclosed in my earlier filed application, Ser. No. 29/095,768, filed on Oct. 29, 1998.

STATEMENT REGARDING FEDERALLY SPONSORED RESEARCH OR DEVELOPMENT

Not Applicable

BACKGROUND OF THE INVENTION

1. Field of Invention

This invention relates to a device for joining metal trusses. More specifically, it relates to a skewable connector for metal trusses.

2. Description of the Related Art

While metal, or steel, trusses have long been used in commercial construction, the use of metal truss construction in residential dwellings is steadily increasing. Metal trusses, as recognized by those skilled in the art, are not joined in the same manner that wooden trusses or joists are capable of being joined. It is known in the art to use a connector when joining metal trusses, such as, for instance, in joining a corner jacks and corner girders. However, there is a need for a skewable connector having positioning tabs in order to properly orient the connector with the truss.

It is therefore an object of the present invention to provide a metal truss connector that is skewable to allow for different angles of joinery.

It is a further object of the present invention to provide a skewable that has positioning tabs for aligning the connector with the end of the truss.

Other objects and advantages over the prior art will become apparent to those skilled in the art upon reading the detailed description together with the drawings as described as follows.

BRIEF SUMMARY OF THE INVENTION

In accordance with the teachings of the present invention a skewable connector for metal trusses having positioning tabs is provided. The skewable connector is formed of a substantially planar piece of rigid material, preferably steel, and in the preferred embodiment defines a quadrilateral. The skewable connector includes a first end and a second end, the junction there between defining a fold line. In order to facilitate skewing of the connector, a plurality of hole members, which are preferably elliptical, are disposed along the fold line. At least two positioning tabs are disposed on said first end proximate the fold line.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
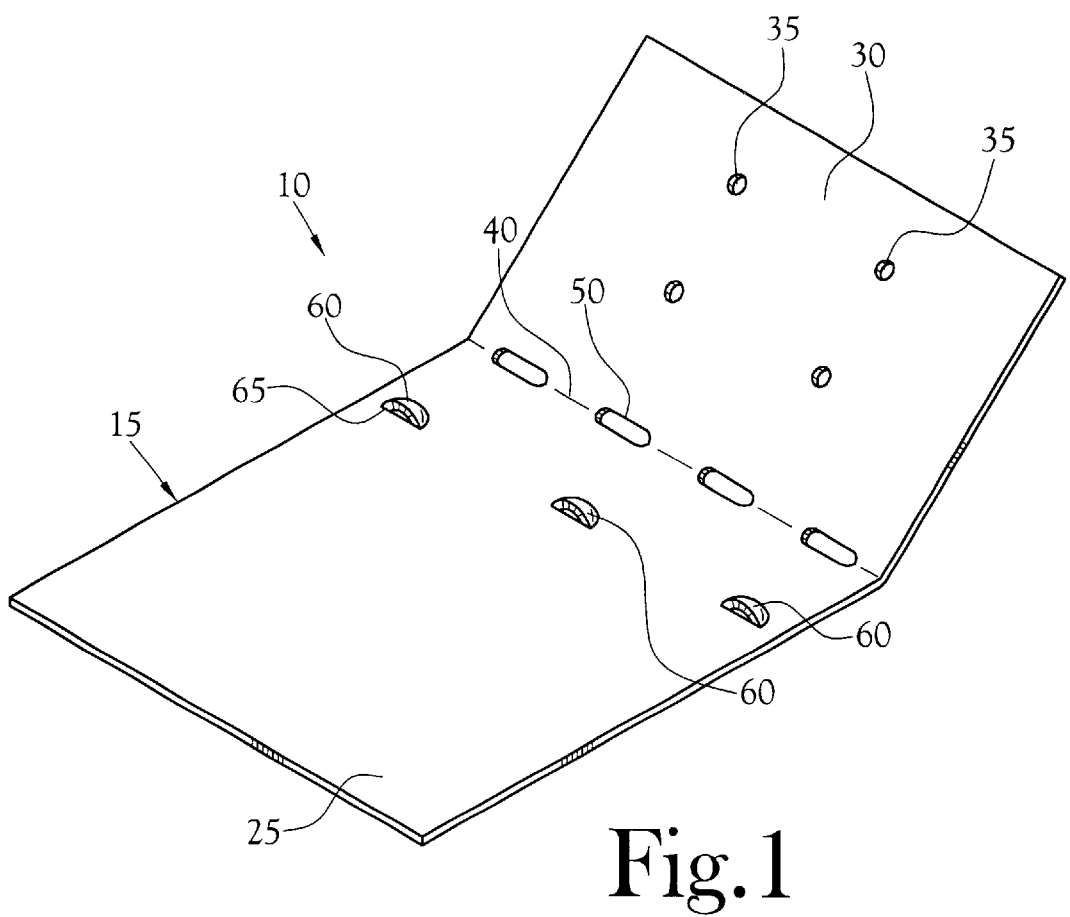
FIG. 1 is a perspective view of the connector of the present invention in a skewed configuration.
Figure 2:
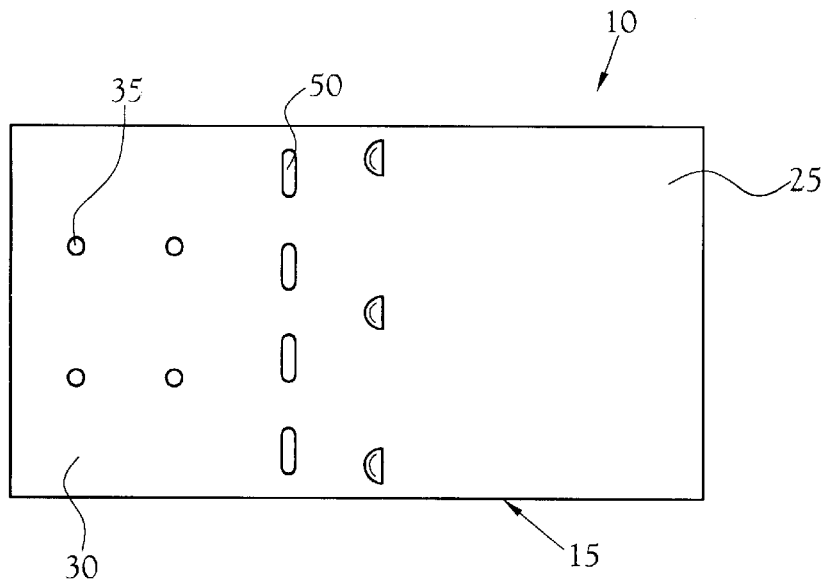
FIG. 2 is a top plan view of the connector of the present invention.
Figure 3:
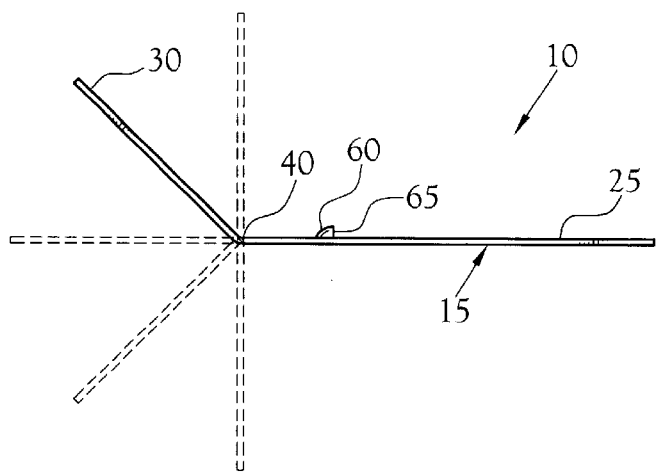
FIG. 3 is a side elevation view of the present invention showing, in phantom, the range of skewing available.

A skewable connector for joining at least a pair of work pieces, such as metal trusses, constructed in accordance with the present invention, is illustrated generally as 10 in the figures. The skewable connector 10 includes a substantially planar member 15 that includes a first end 25 and a second end 30. The first end 25 and the second end 30 are adapted to allow either the first end 25 or the second end 30 to be skewed across a fold region 40 such that the skewed end and the non skewed end are disposed in a different plane from one another. As illustrated in FIG. 3, in the preferred embodiment, the second end 30 is skewable through a range of 180°, it being understood that the preferred minimum angle between the first end 25 and the second end 30 is 90°. In the preferred embodiment, a plurality of hole members 35 are disposed in the second end 30 to allow mechanical fasteners to pass through the second end 30 in order to facilitate securing the skewable connector to a metal truss. In the preferred embodiment, the first end has a length greater than the length of the second end, it being understood that the length dimension extends from fold region 40 to the end of the skewable connector 10 and is perpendicular to the fold region 40.

In the preferred embodiment, skewable connector 10 is fabricated from a strong, rigid material, preferably steel. In order to allow to facilitate skewing of one of the ends of the connector 10, a plurality of hole members 50, which are preferably elliptical, are disposed along fold regions 40. Further, in order to facilitate proper alignment between the skewable connector 10 and an adjoining metal truss, at least two, and preferably three, positioning tabs 60 are disposed on the first end 25 so as to engage the end of a metal truss (not shown). In this regard, the positioning tab 60 can be defined by any raised edge of material. In the preferred embodiment, the positioning tab is integral with the skewable connector 10 and is defined by a quadrisphere that has been pressed from the first end 25 such that the terminal edge 65 of the quadrisphere abuts the metal truss.

From the foregoing description, it will be recognized by those skilled in the art that a skewable connector offering advantages over the prior art has been provided. Specifically, the connector of the present invention provides a connector that is skewable to allow for different angles of joinery and that has integral positioning tabs that facilitate proper alignment of the connector with a metal truss.

While a preferred embodiment has been shown and described, it will be understood that it is not intended to limit the disclosure, but rather it is intended to cover all modifications and alternate methods falling within the spirit and the scope of the invention as defined in the appended claims.

What is claimed is:

1. A skewable connector for joining two work pieces, said skewable connector comprising:
   a substantially planar member constructed of a rigid material, said planar member including a first end and a second end, wherein said first and second ends are integral;
   a plurality of hole members disposed at a junction of said first end and said second end, wherein said hole members allow said second end to be skewable away from a plane defined by said first end; and
   a plurality of positioning tabs disposed on said first end proximate said junction of said first end and said second end, said positioning tabs being adapted for engaging an end of a work piece for aligning said skewable connector with an end of a work piece, wherein each said positioning tab is pressed from said first end such that a terminal edge of each said positioning tab is positioned for aligning said skewable connector with an end of a work piece, wherein said terminal edge of each said positioning tab runs substantially perpendicular to said planar member.

2. The skewable connector of claim 1 wherein said rigid material is steel.

3. The skewable connector of claim 1 wherein said hole members are elliptical.

4. A skewable connector for joining two work pieces, said skewable connector comprising:
- a substantially planar member constructed of steel, said planar member including a first end and a second end, wherein said first and second ends are integral;
- a plurality of elliptical hole members disposed at a junction of said first end and said second end, wherein said hole members allow said second end to be skewable away from a plane defined by said first end; and
- a plurality of positioning tabs disposed on said first end proximate said junction of said first end and said second end, said positioning tabs being adapted for engaging an end of a work piece for aligning said skewable connector with an end of a work piece, wherein each said positioning tab is defined by a quadrisphere, wherein said quadrisphere is pressed from said first end such that a terminal edge of said quadrisphere is positioned for aligning said skewable connector with an end of a work piece.

5. A skewable connector for joining two work pieces, said skewable connector comprising:
- a substantially planar member constructed of a rigid material, said planar member including a first end and a second end, wherein said first and second ends are integral;
- a plurality of hole members disposed at a junction of said first end and said second end, wherein said hole members allow said second end to be skewable away from a plane defined by said first end; and
- a plurality of positioning tabs disposed on said first end proximate said junction of said first end and said second end, said positioning tabs being adapted for engaging an end of a work piece for aligning said skewable connector with an end of a work piece, wherein each said positioning tab is defined by a quadrisphere, wherein said quadrisphere is pressed from said first end such that a terminal edge of said quadrisphere is positioned for aligning said skewable connector with an end of a work piece.

6. The skewable connector of claim 5 wherein said rigid material is steel.

7. The skewable connector of claim 5 wherein said hole members are elliptical.

* * * * *